United States Patent [19]
Bourquardez et al.

[11] 3,765,267
[45] Oct. 16, 1973

[54] CONNECTING ELEMENT BETWEEN TWO MEMBERS ENABLING THEM TO ROTATE IN RELATION TO ONE ANOTHER IN THREE AXES

[75] Inventors: Gaston Bourquardez; Rene Louis Coffy, both of Bouches du Rhone, France

[73] Assignee: Societe Nationale Industrielle Aerospatiale, Paris, France

[22] Filed: Jan. 26, 1972

[21] Appl. No.: 221,032

Related U.S. Application Data
[62] Division of Ser. No. 37,826, May 15, 1970.

[30] Foreign Application Priority Data
   May 20, 1969  France ............................... 6916289

[52] U.S. Cl. .................... 74/581, 161/143, 416/131
[51] Int. Cl. ............................................. F16c 7/04
[58] Field of Search ............................ 74/581, 579; 161/143; 416/131

[56] References Cited
   UNITED STATES PATENTS

| 3,265,554 | 8/1966 | Eldred | 161/143 |
| 3,434,373 | 3/1969 | Ditlinger | 74/581 |
| 3,189,510 | 6/1965 | Eldred | 161/143 |
| 3,475,988 | 11/1969 | Ditlinger et al. | 74/579 |
| 3,228,481 | 1/1966 | Eldred | 416/131 |

*Primary Examiner*—Charles J. Myhre
*Assistant Examiner*—F. D. Shoemaker
*Attorney*—Mauro & Lewis

[57]  ABSTRACT

A connecting element particularly useful for connecting a variable pitch rotor to a hub comprises a flexible elongated portion formed of strong and resilient fibres individually enclosed and agglomerated by a vulcanised elastomer.

7 Claims, 34 Drawing Figures

CONNECTING ELEMENT BETWEEN TWO MEMBERS ENABLING THEM TO ROTATE IN RELATION TO ONE ANOTHER IN THREE AXES

This is a division of application Ser. No. 37,826 filed May 15, 1970.

The invention relates to an elongate connecting element enabling two rigid members which it interconnects to rotate to a limited extent in relation to one another around at least one axis, and preferably around three rectangular axes, with resilient return into a mean inoperative position of the two members.

An element of the kind specified is particularly suitable for connecting a trailer to a vehicle or two consecutive trucks in conveyor systems or, a rotor blade to its hub, since of course fan or blower rotors, rotors compensating the rotor torque of helicopters, and more particularly rotors forming helicopter bearing foils, require their blades to be connected to their hubs in a manner allowing several degrees of freedom.

More particularly, in the main rotors of helicopters each blade must be able to oscillate either perpendicularly to the rotor plane (beat), or in the rotor plane itself (drag) and must also be able to rotate around its longitudinal axis (pitch variation).

This ability to rotate to a limited extent around three rectangular axes corresponding to the three degrees of freedom allowed by a swivel joint is as a rule provided in helicopters via the agency of separate articulating shafts comprising roller bearings. However, when they are loaded by the very considerable centrifugal force of the blades and operate over a small range of rotation, such articulations function under difficult conditions, call for very careful lubrication and often have only a short life, despite constant maintenance.

Various attempts have been made to eliminate one or more articulations, to simplify construction and reduce price and maintenance costs. The final result of these attempts is the so-called "rigid" rotor having properties differing from those of the conventional articulated rotors, not all of them favourable ones.

It has also been suggested to connect the blades to their hub via bundles of resilient strips. As a rule such bundles allow only torsional rotation and bending perpendicular to their planes, bending in their planes being substantially impossible.

It is a main object of the invention to provide a connecting element between two members allowing them to make limited movements in relation to one another equivalent to rotations around three rectangular axes, with resilient return into the inoperative position of the members. If necessary, the members can be enabled to rotate around only one or two axes.

The connecting element according to the invention is characterised in that it comprises, between the members to be interconnected, a relatively flexible elongate portion mainly formed by fibres of high mechanical strength having some resilience and organised in a bundle longitudinally disposed in such portion, the fibres being individually enclosed and agglomerated by a vulcanised elastomer.

The fibres are preferably obtained by the parallel grouping of filaments of silicone glass enclosed in a polymerised thermosetting resin of the epoxy type. The glass, in the form of filaments a few thousandths of a millimetre in diameter, has a very high mechanical strength which may reach 440 hb. The volume of the fibres is 50–80 percent glass, the remainder being the resin and its hardening agent.

After polymerisation, therefore, the fibres have a mechanical strength of the order of 130–240 hb. In comparison, their modulus of elasticity E remains relatively low, of the order of 4,000–5,000 hb, this feature contributing towards the bending flexibility of the connecting element.

For certain applications, the glass filaments or the fibres can be replaced by filaments or fibres of some other material, for instance carbon, boron or a metal having different mechanical characteristics which are more suitable for such applications.

The fibres can be of circular section, but, in dependence on the properties required, their section can be a flattened oval one, or even a rectangular one, one of whose dimensions is larger than the other. Different sections of fibres can be used, for instance triangular or hexagonal sections, to reduce the proportion of elastomer in the connecting element, such proportion being as a rule 20–50 percent, the remainder being taken up by the fibres.

The elastomer used can advantageously be a silicone or polyurethane based one. Its main feature is its shearing modulus G which is preferably fairly low, for instance, 0.1 — 10 hb, so as to allow the fibres to make relative movements during the torsional and bending deformations of the connecting element.

By way of example, the elastomer can have a Shore hardness of 20–80 and a tensile strength of 5–50 bars. Moreover, the elastomer has some deformation remanence — i.e., the deformation work is accompanied by a conversion of energy into heat, this setting up forces depending on the deformation speed, and producing dynamic shock absorption of the movements in which the connecting element shares.

On either side of the elongate portion, the connecting element can comprise reinforced rigid ends adapted to act as a connection to each of the members to be interconnected.

To ensure satisfactory connection, the fibres are continued in such ends, which are formed by a polymerisable resin whose rigidity is much greater than that of the elastomer enclosing the fibres in the elongate portion. More particularly, such resin can be a resin of the epoxy type, identical or not with the resin enclosing the glass filaments.

Moreover, between the fibres such ends can comprise extra reinforcements, more particularly, sheets of metal or glass fabrics preferably forming layers alternating with the fibre layers.

In one advantageous embodiment of the invention on either side of the elongate portion forming a connection between the members, the fibres extend in such members at least partly to form the reinforcement of at least one of the two members.

In the connections between members according to the invention, any movement of one of the members in relation to the other member can be broken down into elementary rotations around three main axes of co-ordinates of such elongate portion — i.e., two bendings in relation to the main axes of a cross-section of the elongate portion, and a twisting in relation to the longitudinal axis thereof.

Since the elastomer enclosing the fibres can be deformed but is substantially incompressible, any deformation of the elongate portion results in a variation in the length of some or all of the fibres, accompanied by a distortion of the enclosing elastomer, since the latter allows adjacent fibres to move in relation to one another, while being tenacious enough to allow only a slight variation in the relative position of the axis of the fibres, thus enabling the element to operate as one single composite member during bending and torsional deformations.

Moreover, the fibres enclose the elastomer and form a kind of trellis around it, so that in each cross-section in relation to the element axis, the elastomer cannot escape or be broken by distention or crushing. The trellising effect can be enhanced by enclosing the elongate portion in a deformable but inextensible sheath.

Elongate articles are known which are formed by filaments of glass enclosed by plastics; however, the plastics is not a flexible elastomer enabling the fibres to make movements relatively in relation to one another. Articles of the kind specified (for instance, fishing rods, skis, vaulting poles, and even helicopter blades in which the fibres, looped on themselves, form attaching eyelets) use the tensile strength and property of resilient bending in one direction at a time of this kind of composite material. Such articles are not adapted to interconnect two members in such a way as to enable them to make movements relative to one another. The articles are not organised to allow complex deformations — i.e., combinations of bending and twisting; nor are they adapted to provide considerable shock absorption of the movements which they allow.

The invention will be fully understood from the accompanying drawings, wherein:

FIGS. 31, 32 and 34 are details of the construction of the connecting element between a rotor hub and a blade;

Figure 1:
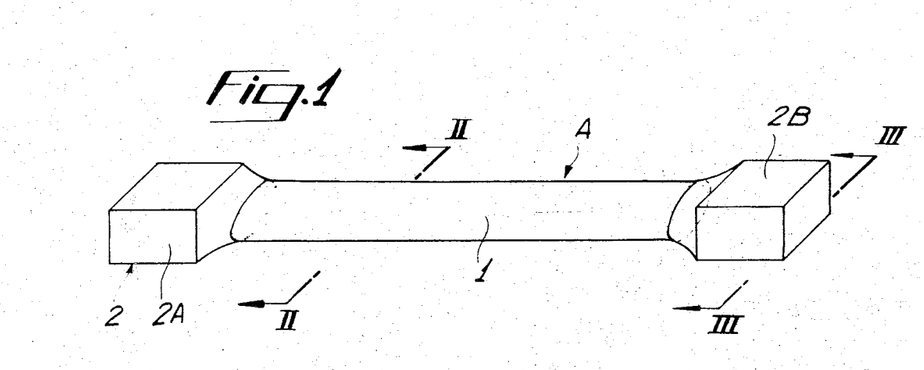
FIG. 1 is a perspective view of a connecting element according to the invention.

Referring to FIG. 1, an element A is made up of a central elongate portion 1 and two rigid ends 2A, 2B. In the embodiment illustrated, the central portion 1 is of oval section; it is formed by longitudinal fibres 3 disposed in bundles which widen out at the ends 2A, 2B, where the fibres are interposed between elements 4 parallel with one another. The elements 4 can be plates; alternatively and preferably they can be made, for instance, of a glass fabric.

The fibres 3 can be formed by a bundle of continuous filaments of glass, for instance a few $\mu$ in diameter, each fibre comprising thousands or tens of thousands of such single filaments to each section of a few square millimetres. In the same fibre, the filaments are agglomerated by a selected polymerised resin, preferably, a resin of the epoxy type.

Alternatively, as will be seen hereinafter, in some cases use can be made of carbon or boron filaments whose modulus of elasticity is much higher, or any other material having suitable characteristics can be used.

In the central elongate portion 1, the fibres are embedded in a vulcanised elastomer 5 which ensures that the fibres are assembled into a single composite bundle. The elastomer is relatively flexible and adherent to the fibres 3, whose surface can be prepared to encourage such adherence. The shearing modulus G of this material is low enough for the fibres to be able to make small movements in relation to one another. Moreover, the material has some deformation remanence, so that energy is absorbed during such deformation.

On the other hand, the resin 6 in which the ends 2A, 2B are enclosed is a rigid polymerised material having a very high shearing coefficient, in order to introduce into the fibres and distribute therebetween the loads of the elements to be interconnected. The material can be, for instance, an epoxy resin of the same kind as that enclosing the glass filaments.

Figure 4:
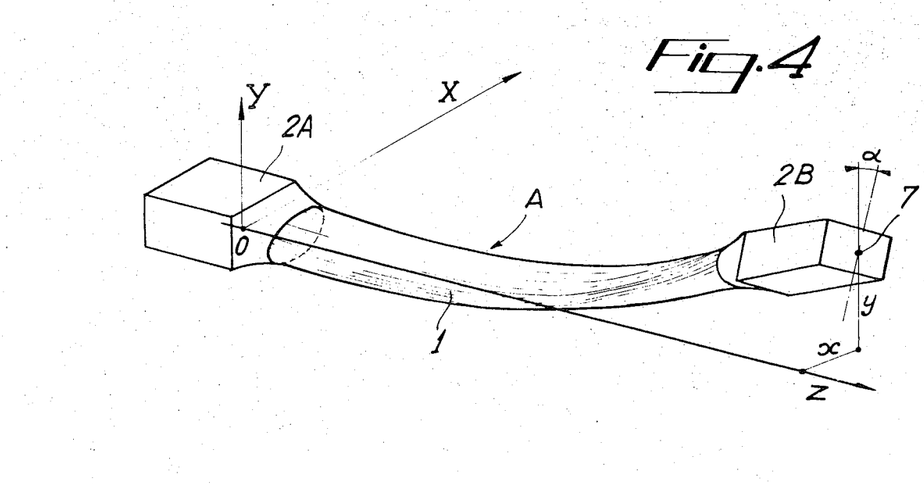
FIG. 4 shows the connecting element deformed by a movement of the two members which it interconnects.

With a connecting element constructed in this way, a member rigidly connected to the end 2B can be displaced with three degrees of freedom in relation to a member rigidly connected to the end 2A — i.e., if the end 2A is given the reference trihedron OXYZ, the centre 7 of the end face of the element 2B can be displaced along a vector $x$ (rotation around the axis OY) and along the vector $y$ (rotation around the axis OX). Moreover, the end 2B can pivot, for instance, by an angle $\alpha$ in relation to the end 2A (rotation around the axis OZ).

These various displacements are allowed by the deformation of the elongate portion 1 in which the fibres 3 are bent and resiliently vary in length, while the enclosing elastomer is subjected to an elasto-plastic distortion. The elastomer is inter alia flexible enough to allow twisting by the angle $\alpha$, causing an elongation with helical conformation of the peripheral fibres in relation to the central fibres, with a relative displacement of the former in relation to the latter.

The deformation remanence of the enclosing elastomer absorbs the shock of the movements of the end 2B during the displacements caused therein by the interconnected members.

Of course, the ends 2A, 2B must be so shaped as to enable them to be connected to the solid members to be interconnected.

The vulcanisable elastomer 5 and the polymerisable resin 6 enclosing the filaments which, after crosslinkage and polymerisation respectively, give the connecting element its solid shape, must have satisfactory adhesion but be chemically incompatible with one another; preferably they must have compatible curing temperature with that of the polymerisable resin 6 so that they can be treated simultaneously in the same mould and thus produce the required connecting element in one single operation.

The enclosing materials 5, 6 must also be impermeable to water and unattackable by atmospheric agents; they must ensure the insulation and protection of the fibres 3. The materials must of course maintain such properties over a long period.

Figure 2:
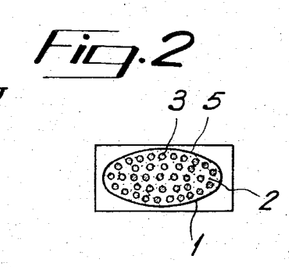
FIGS. 2 and 3 are sections, taken along the lines II — II and III — III in FIG. 1 respectively.
Figure 3:
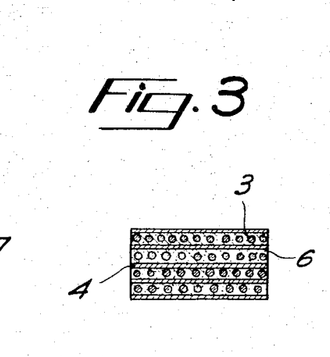

The section, an oval one in the embodiment illustrated, of the portion 1 enables the rigidity of the connecting element to be selected in each of its directions of movement. For instance, an oval section allows readier bending in the direction of the minor axis than of the major axis of the section and reduces torsional rigidity, in comparison with a circular section.

A very advantageous application of elements of the kind specified is to connect the blades to the hub in helicopter rotors, thus enabling extremely simple hubs to be constructed and eliminating the three conventional articulations for pitch, beat and drag at the base of each blade.

However, the hubs behave in a very similar manner to articulated hubs, the movements of the hub during flight differing only slightly.

Moreover, by suitable selection of the resilient and kinematic properties of the flexible elements, flight properties or constructional simplifications can be achieved which are impossible with articulated rotors.

For instance, a suitable selection of the drag rigidity, combined with adequate shock absorption provided by the nature of the material 5, enable interblade connection and drag shock absorbers to be eliminated, such as are as a rule needed with articulated hubs to obviate imbalances on starting, and also ground and air resonance or blade vibrations (flutter).

Since the resilient facilities making up for the articulations are integrated in the connecting element, and the pitch lever in practice acts directly on the blade, helicopter hubs can have very ridid blades, inter alia against torsion, and this has some advantage at high speeds, as regards the behaviour of the blade and the possible occurrence of vibrations.

Moreover, the absence of articulations obviates all lubrication systems, the associated maintenance, and systematic overhauls.

The resulting simplicity and saving in space produce a considerable reduction in weight, improved aerodynamic properties and relatively easy and cheap manufacture.

A description will now be given, with reference to the drawings, of various embodiments illustrating inter alia certain constructional features to be claimed and affording technical, kinematic or dynamic advantages, such features being non-limitative and independent of the embodiment in relation to which they are illustrated.

Figures 5, 6:
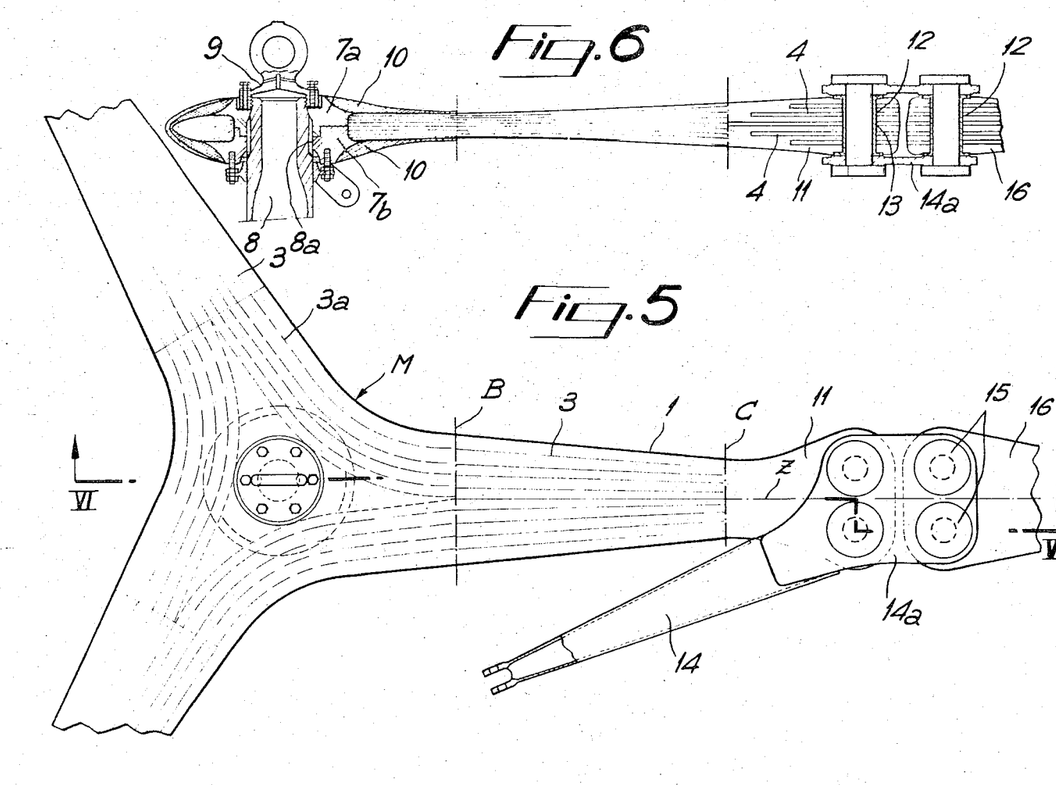
FIG. 5 is a plan view of a first embodiment of a helicopter rotor having connecting portions according to the invention between the hub and blades.
FIG. 6 is a section, taken along the line VI — VI in FIG. 5.

In the three-blade rotor construction shown in FIGS. 5 and 6, the connecting element 1 is disposed between the sections B and C whose surfaces are equivalent, but whose evolution of shape is so selected as to ensure the required rigidity properties in beat and drag, to obtain the required specific blade frequencies and a fictive beat articulation close to the rotor axis. For these various purposes, the section B of the element 1 adjacent the hub is greatly flattened in the plane of the rotor, while the section C is close to a circle adjacent the blade base.

Moreover, the longitudinal axis z of the element 1 is forwardly offset to balance the drag force by centrifugal force, and in construction such axis has a rising inclination $\alpha_1$ in relation to the plane of the rotor.

The ends (corresponding to 2A) adjacent the axis of the hub M of the connecting elements coincide in a single block made rigid by the impregnating polymerised resin forming the body of the hub M. The fibres of an element are continuous from one arm to the other, as shown by the curved lines 3a, so that each element is formed by fibres which also belong to the two others. During moulding, the bundles of impregnated fibres are placed between two stellate members 7a, 7b, with which they are unitary after polymerisation. The stellate members 7a, 7b, connect the hub to the rotor shaft 8 and transmit thereto, via grooves 8a and nut 9, lift and torque forces and control forces coming from the rotor via the agency of the connecting elements 1. On the other hand, the centrifugal forces of the blades, equilibrated from one arm to the two others, are not transmitted to the stellate members 7a, 7b.

An envelope 10 formed by a number of layers of glass fabric impregnated with the resin 6 reinforces the hub and protects the inside elements. For the sake of clarity, various known members are shown which assist the attachment of the hub to the rotor shaft, the entrainment of the plate causing the cyclic variation in pitch, and the raising of the apparatus (none of these members form part of the invention).

On the side of the blades, the end (corresponding to 2B) of the connecting element 1 is thickened and takes the form of a flat head 11 by the addition of interpolated reinforcements 4. The head 11 is formed with two bores 12 having bushes 13 allowing the attachment of the head 14a of the metal blade lever 14. The head 14a takes the form of a double cap and allows, by means of pivots 15, the attachment of the base 16 of the blade which can be constructed in any manner.

The embodiment illustrated in FIGS. 7 to 12 is similar to that illustrated in FIGS. 5 and 6, but the formation of the blade side end of the connecting element 1 differs.

Figures 7, 8, 9, 10, 11, 12:
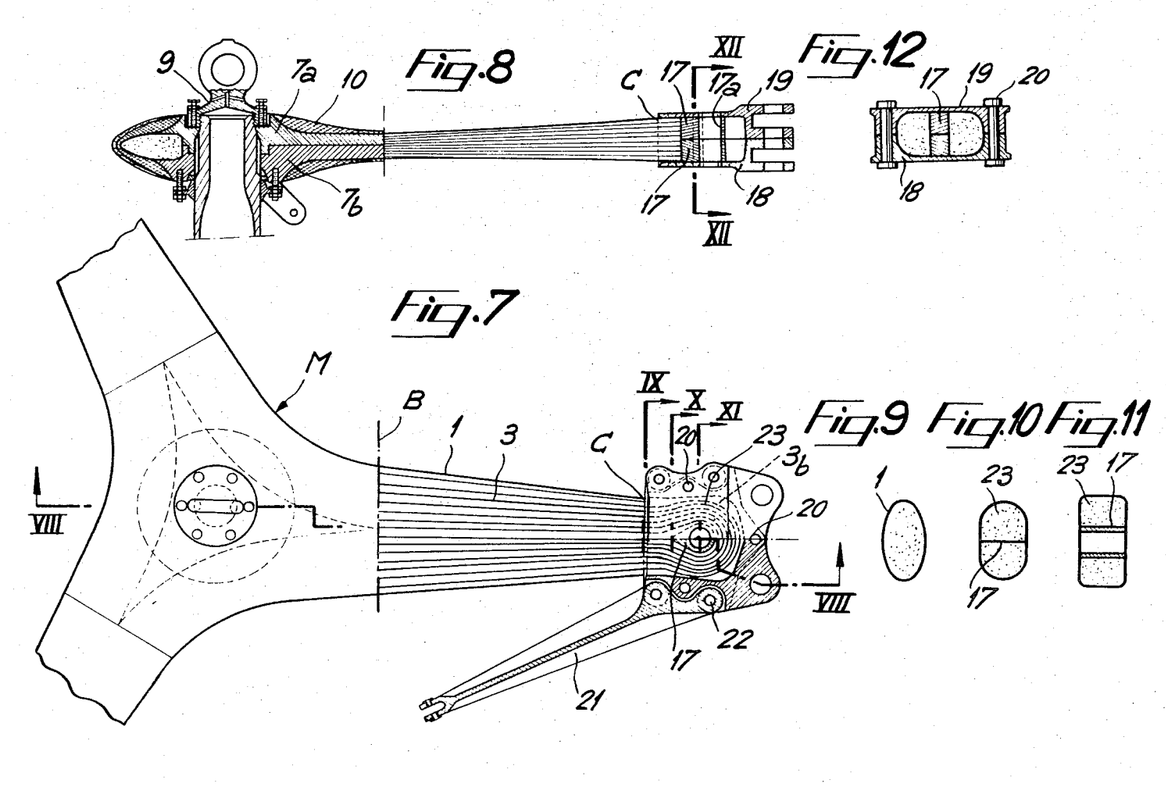
FIG. 7 is a plan view of a second embodiment of the rotor according to the invention.
FIGS. 8 and 11 are sections, taken along the lines indicated by the corresponding Roman numerals in FIG. 7.
FIG. 12 is a section, taken along the line XII — XII in FIG. 8.
Figures 13, 14, 15, 16, 17, 18:
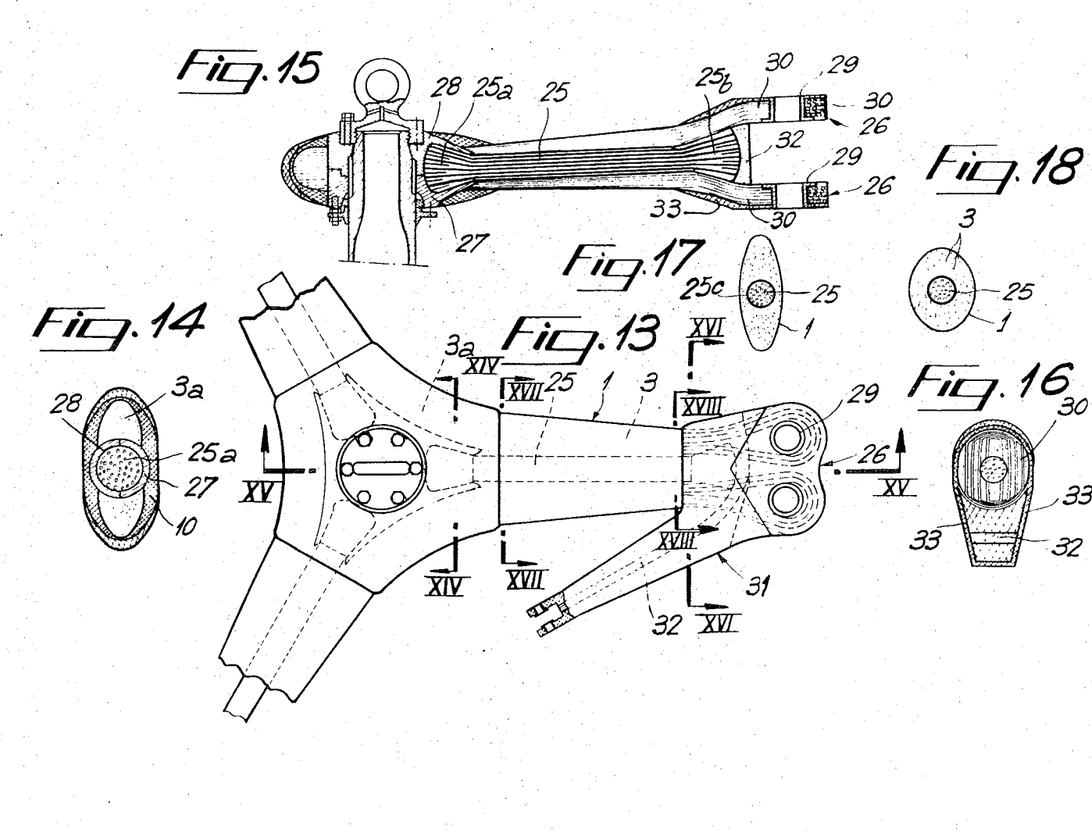
FIG. 13 is a plan view of a third embodiment of a rotor.
FIGS. 14 to 18 are sections, taken along the lines indicated by the corresponding Roman numerals in FIG. 13.

The fibres 3 form loops 3b which are rounded around cores 17 inserted into the loops during moulding. The cores are formed with a hole 17a and are in the shape of a wedge whose tip is directed towards the hub M. The outer end of the connecting element therefore takes the shape of a head 23 which is thickened in relation to the flexible portion 1. As shown in FIGS. 9 to 11, the section of the head 23 therefore progressively passes from oval to rectangular. A fitting in two portions 18, 19 the hollows of which correspond to the required shape of the head 23, is assembled rigidly by glueing and pins 20, after the moulding operations.

The cores 17 introduced during moulding act as reinforcements and jam the head 23 to prevent it from escaping from the members 18, 19 as a result of centrifugal forces. The hole 17a in the cores is adapted to ensure that the members 18, 19 are retained rigidly in position. Blade lever 21 is attached to the members 18, 19 by pins 22.

This assembly has the advantage that it does not weaken the fibres on the blade side connection end by the drilling of holes.

The three-blade rotor construction illustrated in FIGS. 13 to 16 can be produced integrally in one single operation, including the levers controlling the blade pitch.

Moreover, in this embodiment the connecting element 1 has the special feature allowing a reduction in the forces for controlling the blade pitch variation; if for reasons of resilience in the beat direction, the connecting element is given a flattened shape, when the blade pitch is modified by the twisting of such element, the centrifugal force causes, by radial pulling, a return force opposing the torsional control and tending to return the element to the non-twisted, flat position. A force of this kind is sometimes called a "double-wire return" by analogy with the return force excited on a member suspended from two non-concurrent wires.

For any given torsional angle, such return force is more considerable in proportion as the connecting element is shorter.

The construction illustrated in FIGS. 13 to 16 reduces such return forces and therefore allows the production of short connecting elements and therefore a more compact hub.

In this embodiment the majority of the centrifugal force is transmitted by a circular central element or core 25 of small diameter which produces minimum return.

The outer filaments forming the flattened section operative in the direction of drag and beat are then not very heavily loaded by centrifugal force and under torsion produce a return which is also not very considerable, the total return being finally very considerably lower than that which would be produced by the same section constructed in a homogeneous manner.

To this end, the core 25 is formed by filaments much more rigid than the glass filaments, for instance carbon filaments which have a modulus of elasticity E of 23,000 – 42,000 hectobars, in dependence on their origin.

For the same elongation, and having regard to the respective sections, the core 25 then supports up to 80 percent of the total load due to centrifugal force and, due to its circular section, the return torque developed by the centrifugal force during the twisting of the core is very low. For connection between the blades and the hub, the ends of the core 25 take the form of cones or frustrums 25a, 25b received directly in the blade-attaching cap 26 and in the hollows of the metal members 27, 28 of the hub body.

For manufacturing purposes, the central core 25 is a member which is moulded and polymerised separately, and then placed in the centre of each of the connecting elements of the hub during moulding. For fixing purposes, the core 25 is glued at its ends; it can be insulated by a flexible peripheral film 25c.

The hub body is formed in a shape similar to that of the hubs shown in the preceding Figures. The only basic difference is to be found in the stellate metal members 27, 28 which are formed with recesses receiving the terminal cones or frustrums 25a of the cores 25.

In this case the blade side end of the connecting element 1 has no members corresponding to the members 18, 19, the cap 26 receiving the blade being directly shaped during moulding.

The fibres 3 of the outer portion of the element 1 are looped around bushes 29 of the cap 26. Moreover, the loops are distributed in layers between which the layers of glass fabric 30 reinforcing the blade lever 31 are inserted. The blade lever 31 also has a core formed by a bundle of glass filaments 32 which widens out to enclose the end of the cone 25b.

The assembly is hooped by a belt 33 put in place after moulding and which, continued as an envelope over the blade lever, completes the assembly solidity.

The metal bushes 29 might also be applied by glueing after the axial holes for attaching the blade have been drilled.

In the three-blade hub construction illustrated in FIGS. 19 – 23 and 33, a number of constructional features are adapted to improve the solidity and dynamic properties of the hub.

As in previous instances, the connecting element 1 has an evolute section but the surface thereof (FIG. 21) is larger towards the hub than towards the blade. In this way the specific frequencies of oscillation of the blade and the development of stresses can be more satisfactorily adjusted.

Figures 33, 34:
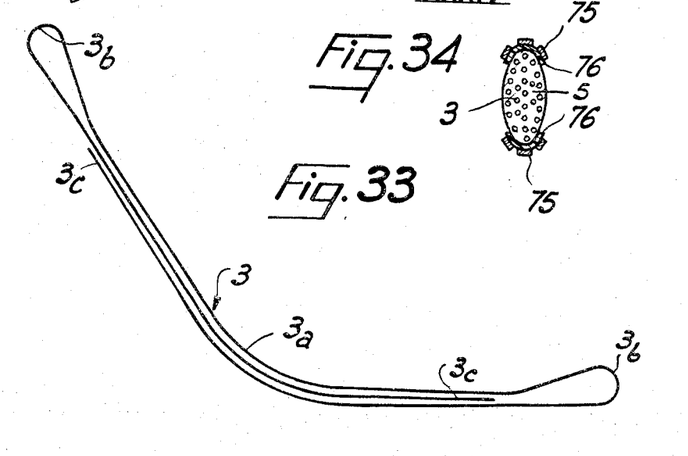
FIG. 34 is a section, taken along the line XXXIV — XXXIV in FIG. 32.
FIG. 33 is a diagram showing the shape of a filament used in the embodiment illustrated in FIGS. 19 to 23.

This result is obtained by shaping the fibres 3 as shown in FIG. 33.

A certain number of fibres 3, extending from one connecting element (or arm) to the other, forming loops 3b at the ends and being curved at 3a between such terminal loops, have a limited length, and their ends 3c terminate in the elements 1. The cut-off ends 3c therefore no longer share in the tensile strength of the element 1, but they partly contribute towards its bending rigidity and improve the shock absorbing properties of the assembly.

Moreover, the flattened section (FIG. 21) of the connecting element has its major axis inclined to the rotor plane by the same angle $\theta$ as the blade base, thus simplifying the construction of the blade lever 35. The two opposite caps 35a, 35b associated with the blade lever to ensure the connection between the arm and the blade are therefore aligned, and so are the main axes of inertia of the sections of the arm and blade, thus ensuring improved continuity of the rigid elements of the blade and hub, and improving dynamic behaviour.

Figures 19, 20, 21, 22, 23:
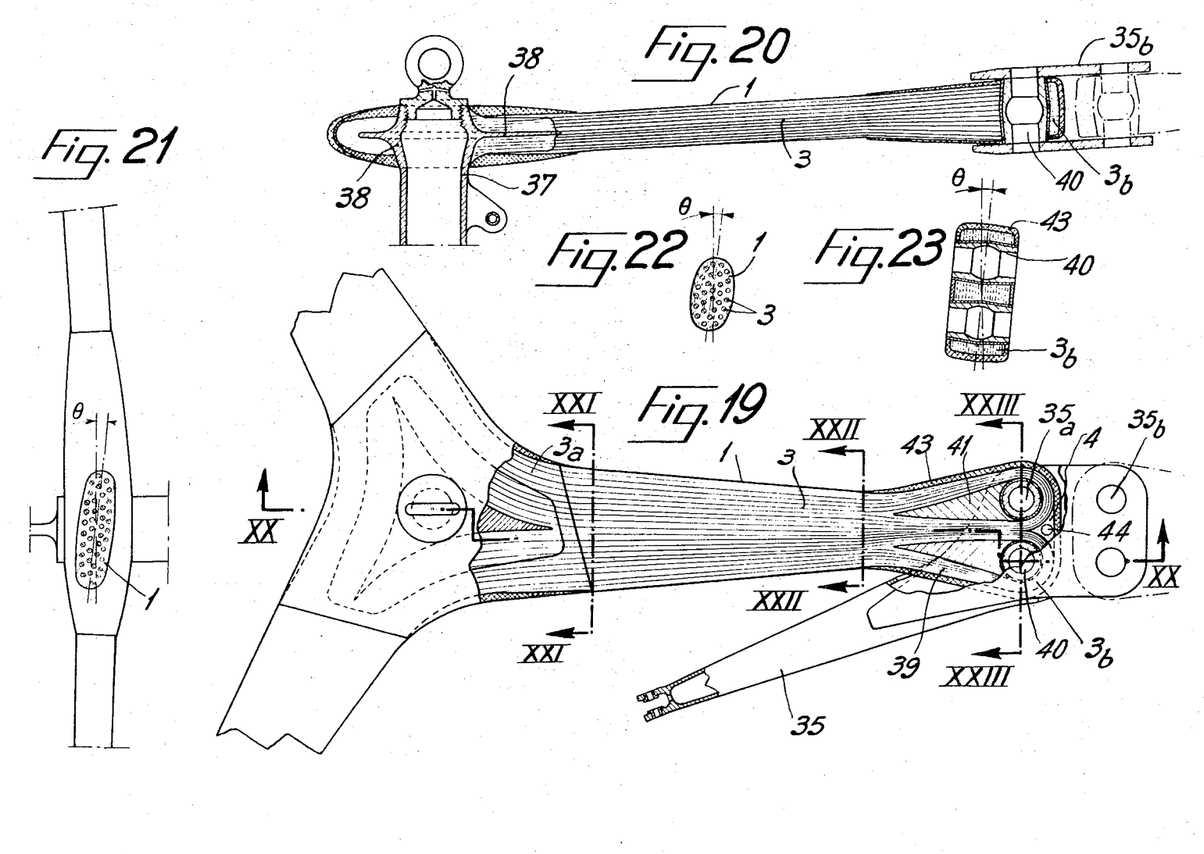
FIG. 19 is a plan view of a fourth embodiment of a rotor.
FIGS. 20 to 23 are sections, taken along the lines indicated with the corresponding Roman numerals in FIG. 19.
Figure 24:
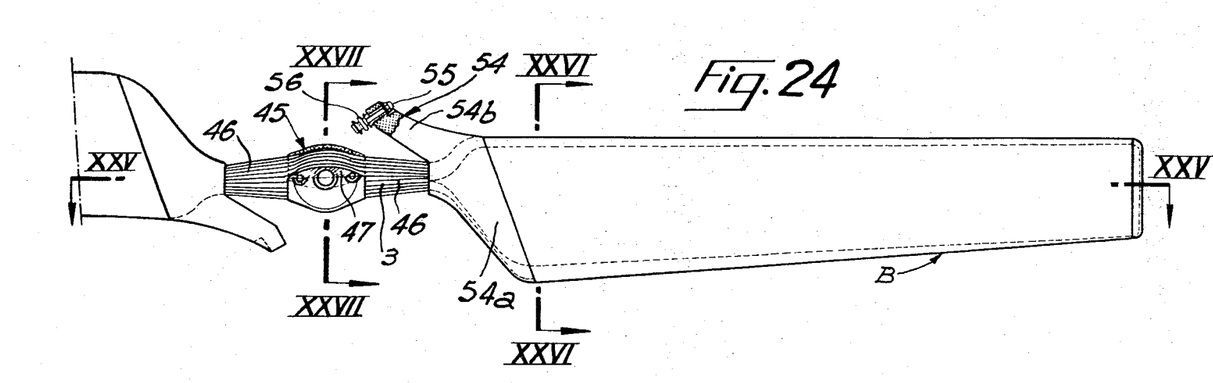
FIG. 24 is a plan view of a double-blade rotor.
Figures 25, 26, 27:
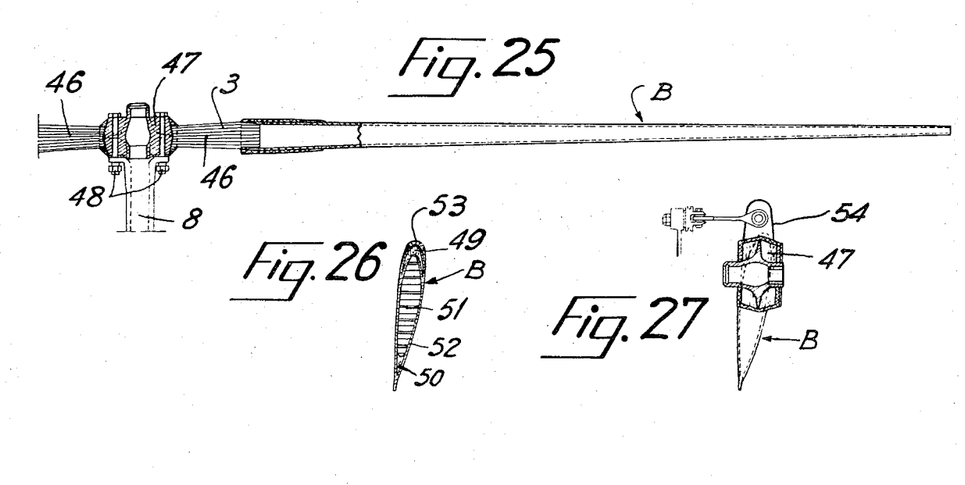
FIGS. 25 to 27 are sections, taken along the lines indicated by the corresponding Roman numerals in FIG. 24.

The inclination of the major axis of the section by the angle $\theta$ might be gradually obtained by twisting the elongate portion during moulding.

The hub side ends of the connecting elements forming the body of the hub are directly moulded on to the rotor shaft 37 suitably shaped for this purpose, so as to avoid any assembly at this level and transmit directly the very high alternating loads occurring at this point.

To this end, the shaft 37 terminates in a stellate tip 38 whose three arms are of cruciform section so as to receive the bundles of filaments which transmit to them the lift, rotor torque and bending forces.

This integral assembly of the rotor shaft with the blade-bearing arms results in a very simple and lightweight unit.

Moreover, on the blade side the end 39 of the connecting element takes the form of a head having two incorporated axes. To this end, as in preceding instances, the fibres 3 are looped at a place 3b and extend around metal bushes 40 receiving and transmitting the forces set up by the blades. Each bush 40 is associated with a wedge 41 forming a reinforcement, the wedge filling the space between the strands connected by the loops 3a and preventing their excessive curvature.

The bushes 40 are also slightly barrel-shaped. Together with the wedges 41, they can be introduced on termination of moulding with the interposition of a film of glue. The bushes 40 therefore support one another when compressive stresses are exerted on the wedges 41 which re-transmit such forces to the resistant elements of the head, such effect being completed by the bushes 40 bearing against an outer enclosure 43 which can be made of metal or layers of glass fabric. The member 43 bears against the end of the head. The hole 44 between the member 43 and the loops 3b of the fibres 3 can receive dynamic equilibrating masses for the hub, if necessary.

The connecting elements enable non-articulated rotor hubs to be produced for any number of blades. When there is an even number of blades, construction is further facilitated, since the majority of fibres can extend and form two diametrically opposed arms without discontinuity.

FIGS. 24 – 27 show a double blade rotor particularly suitable for the anti-torque rotor of a helicopter.

In this construction, the hub, the two blades B and the blade levers are moulded in one single operation. The assembly thus forms an interchangeable element which is equilibrated and regulated in advance and which costs much less than a conventional articulated assembly with separate blades; moreover, the assembly is substantially lightened by the elimination of the blade-attaching elements, this being a considerable advantage with rotors displaced at a distance behind the centre of gravity.

In this construction, the hub 45 is formed by joining two rigid ends of connecting elements 46. The reinforcing fibres 3 extend from one to the other, passing around a metal core 47 whose cruciform section receives one-quarter of the fibres 3 in each of its hollows. The core 47 also insures connection to rotor shaft 8 via pins 48.

The rigid outer ends of the connecting elements are in the form of blades, in accordance with a known construction. To this end, the fibres are deflected to form on the one hand a strong C-shaped longitudinal member 49 forming a leading edge, and a member 50 forming a trailing edge, a lightweight cellular filling 51 being disposed between the members 49 and 50. A cladding 52 and a leading edge protection 53 complete the blade B, which can if necessary comprise suitably disposed equilibrating masses.

Lever 54 forms an integral part of the rigid end of each connecting element 46, in a similar manner as that illustrated with reference to FIGS. 13 to 16. The lever 54 is therefore mainly formed by an envelope 54a made up of layers of glass and resin and enclosing the end of the blade in the portion where the fibres 3 are strongly deflected, thus reinforcing such portion. An appendix 54b of the envelope receives at its end members 55 for connection to the pitch control rod 56.

Figure 30:
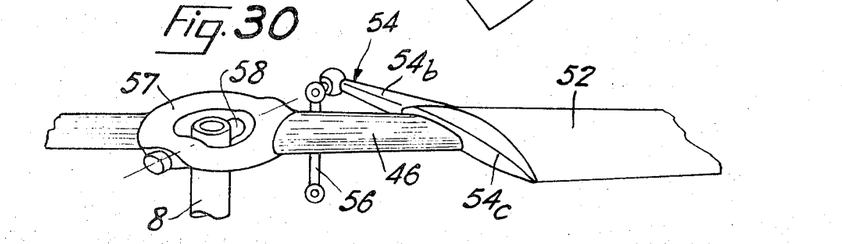
FIG. 30 is a perspective view of a different kind of double-blade rotor.

FIG. 30 shows a variant of the construction illustrated in FIGS. 24 – 27.

In the variant shown in FIG. 30, the hub 57 is annular and not attached to the shaft 8 directly but via an inclined articulation 58. More generally, one or two articulations or some equivalent flexible element can be provided between the hub and the rotor shaft, such articulations not being attached directly to the blades and therefore not being subjected to centrifugal force.

In the embodiments disclosed, the section of the connecting element between the hub and each of the blades is a flattened oval in the rotor plane, the major axis of the oval decreasing as it moves away from the hub axis. This preferred section might be replaced by a H-shaped section or a ribbed section also evolute and having the same mechanical properties as the oval section.

Figure 28:
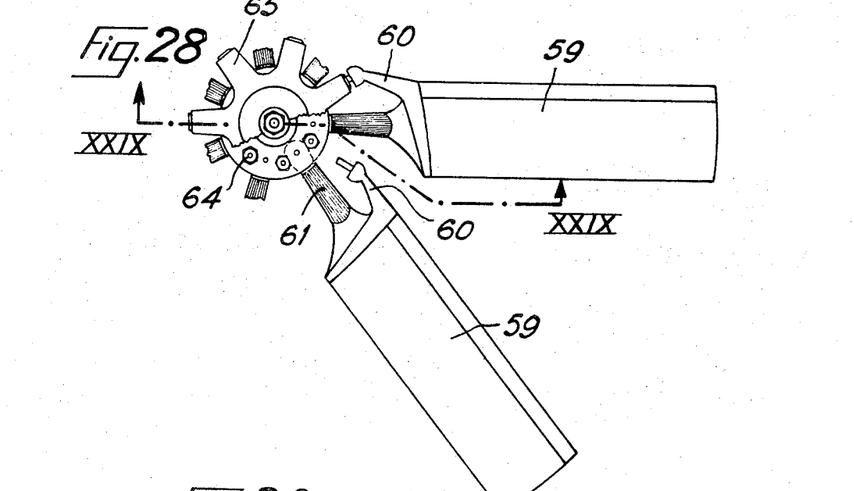
FIG. 28 is a partial plan view of an embodiment of a multi-blade rotor.
Figure 29:
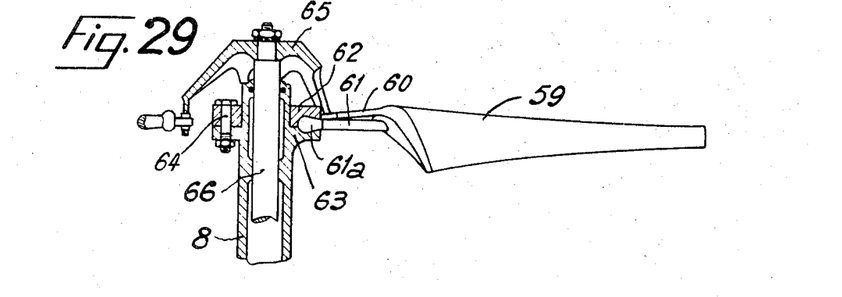
FIG. 29 is a section, taken along the line XXIX — XXIX in FIG. 28.

FIGS. 28 and 29 show the application of the flexible connecting elements to a rotor having a large number of blades and turning at high speed, such as the rotor of a streamlined screw, or a compressor.

In the embodiment illustrated, the blades 59, with their pitch control lever 60, are made from laminated glass comprising a longitudinal reinforcement of filaments. The bundle of such filaments emerging from the blade on the hub side is formed by fibres enclosed in vulcanised elastomer to form the connecting element 61 which terminates in a conical head or frustrum 61a obtained by the widening out of the fibres and their impregnation with a polymerisable resin. The conical heads 61a are trapped between the two halves of the hub 62, 63, one of which is rigidly connected to the shaft 8 and which are assembled by pins 64.

Spider 65 controlled by shaft 66 enables the pitch of the blades to be adjusted by levers 60.

Figure 31:
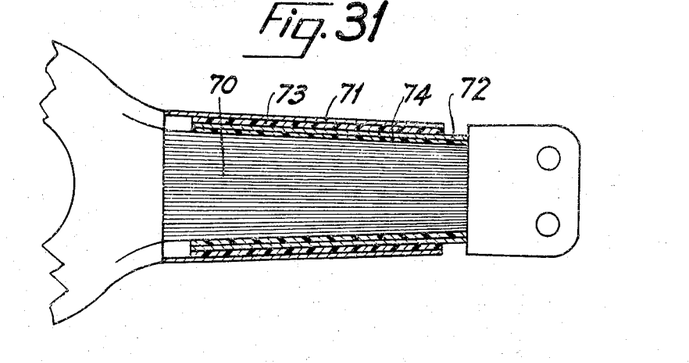
Figure 32:
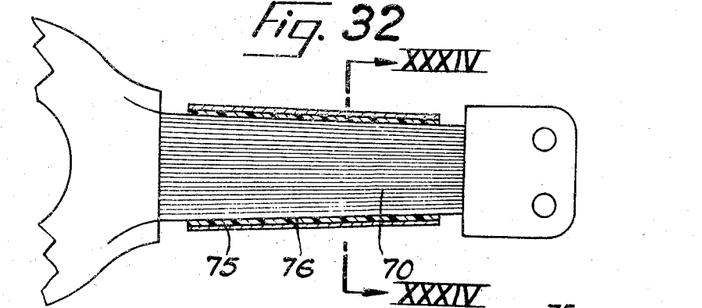

FIGS. 31, 32 and section 34 show a detail of the embodiment which is advantageous if the structural shock absorbing properties which the connecting element already possesses to a certain degree are to be further increased, for instance to obviate resonance problems near the ground, with some kinds of helicopter main rotors.

In this case the elongate portion 70 of a connection element comprises over some or all of its periphery longitudinally rigid strips connected to such elongate portion via the agency of an elastomer similar to or different from that used for the connecting element, or via the agency of a silicone-based adhesive mastic having to a high degree the properties of deformation remanence producing structural shock absorption.

Such longitudinally rigid strips are not connected, or connected on one side only, to the rigid ends of the connecting element and therefore do not share in the elongation of the immediately subjacent fibres during bending deformations. The connecting material is thus subjected to shearing distortions which set up, by deformation remanence, the required shock absorbing forces, in a manner similar to that already described with regard to the elastomer 5 of the connecting element.

Referring to FIG. 31, the two rigid ends of the connecting element are connected respectively to longitudinally rigid strips 71, 72, while the space between the central portion 70 and the strip 72, and also the space between the strips 71 and 72 are filled with the elastomer or the adhesive mastic.

In a bending movement in the plane of the drawing, the fibres subjacent to the strip 72 are elongated, for instance, while the strip 72 is not elongated, but is displaced in relation to the strip 71, thus causing shearing distortions in the connecting material 73, between the strips and the connecting material 74 between the strips and the central portion.

For the sake of clarity, only two strips are shown. A certain number of them can be stacked up in the same way, connected alternately to one end or the other, the effect being to multiply the shock absorbing effect. Alternatively, to facilitate construction, a bundle of alternating strips can be produced independently which can be connected rigidly to the ends, or via the agency of an articulation.

FIG. 32 shows an analogous structural detail which is simpler but less effective and comprises only one single strip 76 not attached to the ends but stuck to member 70 and to rigid strips 75 the operation of the strips 75 and 76 is based on the same principles.

We claim:

1. A connecting element between two rigid members enabling between them transmission of forces and relative rotational displacement comprising rigid end portions of which at least one partly forms one of said members, respectively secured to each of said members and an intermediate elongated portion, said element substantially comprising a bundle of fibres, each fibre being made of a bundle of a very large number of continuous mineral filaments agglomerated by a polymerized resin, said fibres being agglomerated by a polymerized resin in said end portions and by a vulcanized elastomer in said intermediate portion.

2. A connecting element according to claim 1, wherein at least one rigid end portion of said connecting element is widened out in the form of a frustum whose axis corresponds to the axis of the intermediate portion, the frustum being fitted into a recess in one of the members to be interconnected.

3. A connecting element according to claim 1, wherein the fibres are separated into two portions, and the rigid end portions are in the form of forks, each fork embracing one of the members to be interconnected.

4. A connecting element according to claim 1, wherein the intermediate portion comprises at its periphery, in accordance with at least one of the main directions of its cross-section, longitudinally rigid strips connected to such portion by a resiliently flexible material in order to increase the structure shock absorption of the connecting element.

5. A connecting element according to claim 4, which comprises a single layer of strips only connected to said intermediate portion.

6. A connecting element according to claim 4, which comprises at least two layers of strips which are connected to one another by a resiliently flexible material, each layer being connected by one end only to one of the rigid ends of the connecting element, one end or the other alternately in the case of multiple layers.

7. A connecting element between two rigid members enabling between them transmission of forces and relative rotational displacement comprising end portions rigidly secured respectively to each of said members and an intermediate elongated portion, said element substantially comprising a bundle of fibres, each fibre being made of a bundle of a very large number of continuous mineral filaments agglomerated by a polymerized resin, said fibres being agglomerated by a polymerized resin in said end portions and by a vulcanized elastomer in said intermediate portion, and wherein the intermediate portion further comprises a central core formed by fibres including mineral filaments having a modulus of elasticity higher than that of the filaments of the fibres enclosing said core.

* * * * *